Nov. 19, 1929.    M. COLLIS    1,736,579
DIE FOR IMPRINTING PLASTIC MASSES
Filed Oct. 15, 1926
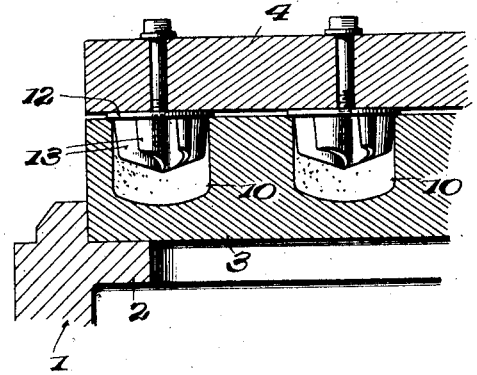
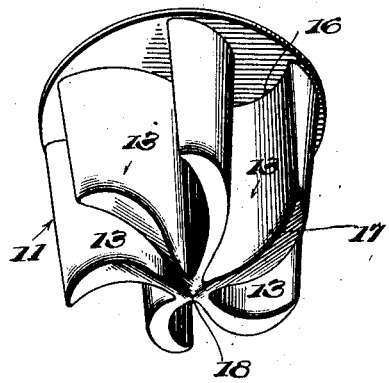
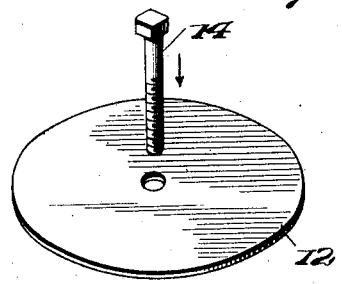
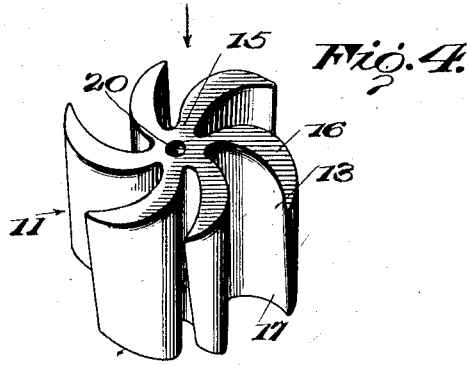
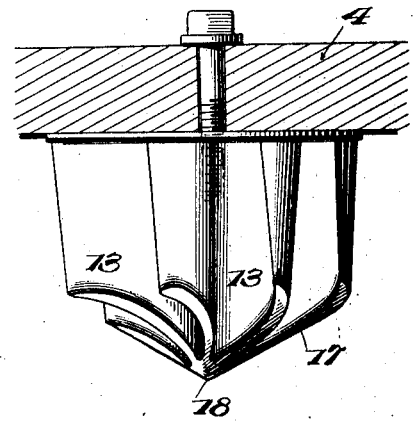
INVENTOR
Meyer Collis.
BY
ATTORNEYS Patented Nov. 19, 1929

1,736,579

UNITED STATES PATENT OFFICE

MEYER COLLIS, OF PHILADELPHIA, PENNSYLVANIA

DIE FOR IMPRINTING PLASTIC MASSES

Application filed October 15, 1926. Serial No. 141,840.

This invention relates to improvements in dies, it being particularly adapted for imprinting dough blanks or masses prior to the baking thereof, there being provision for separating the parts of the die so that it may be readily cleaned from time to time, as may be required.

Other objects and advantages appear in the following specification, reference being had to the accompanying drawing in which Figure 1 is a sectional view of enough of an imprinting machine to illustrate the application of the improved die;

Figure 2 is an inverted perspective view of one of the dies;

Figure 3 is a detail side elevation, parts being shown in section;

Figure 4 is a detail perspective view of the die body alone;

Figure 5 is a detail perspective view of the separable top plate, the securing screw also being shown.

While the invention is an improvement in dies in general, it is more particularly an improvement on the die disclosed in my patent on Biscuit imprinting machine No. 1,551,088, granted August 25, 1925, to which patent reference may be had. Briefly describing those parts of the patented imprinting machine with which the die is concerned, the base 1 is provided with a top 2 upon which a tray 3 rests when in the position for imprinting the dough blank.

A follower or presser head 4 is moved up and down in respect to the tray 3 by a mechanism disclosed in the patent, the tray 3 having pockets 10 into which the foregoing masses of dough are placed. The presser head carries a plurality of dies 11 for the purpose of imprinting the dough blanks when superimposed thereupon in the pockets 10, and inasmuch as the construction of all of the dies is alike, the description of one will suffice.

The die body (Figure 4) is chiefly composed of a plurality of blades 13 which are made integrally with a core or hub 15 from which they extend in curvilinear directions as shown. The blades are thicker at the bases 16 than at the extremities 17 thereby producing a tapering cross sectional shape in the direction of the length thereof, facilitating introduction and withdrawal into and from the dough blank. The extremities of the blades are formed on a slope (Figures 1 and 3), all converging to a central point 18. The special formation of the extremities of the blades impresses the blank to better advantage and permits forming a better shaped roll than if the extremities ran straight across.

A plate 12 engages the die body 11 at the bases 16 of the blades (Figures 1, 2 and 3). The plate 12 is larger than the greatest diameter of the die body, thus leaving a flange around the die body (Figure 1), to engage on top of the tray 3 when the head 4 is in the imprinting position, thereby preventing any dough from squeezing out of the dough pocket 10. This plate has a central hole 19 through which a screw or bolt 14 is introduced and screwed into the threaded bore 20 of the core 15. The bolt 14 passes through the head 4, the head of the bolt being easily accessible to permit removal of the bolt and the disassembly of the die body 11 and plate 12 so that the recesses between the blades 13 may be cleared of dough and the like adhering therein.

It is an important consideration that the die body 11 and plate 12 are made of aluminum or other non-rusting material. The follower head 4 is usually made of iron which in time will develop rust spots if the dough be permitted to come into contact therewith. The plate 12 not only guards against the contact of the dough with the follower head but forms a closure for the top of the recesses between the blades 13. After use for a certain length of time, it will be found that pieces of dough will lodge in the corners of the recesses between the blades 13 next to the plate 12. It is a difficult matter to clean out the crevices with the die in place in the machine.

But by making it possible to readily disassemble the die body and plate 12 from each other and from the follower head 4, it becomes an easy matter to draw a suitable implement through the crevices between the blades and thus dislodge any adherring dough. The separable feature also introduces an advantage in originally making the die. The pattern from which the die body is made is more readily and easily fashioned if constructed separately from the plate 12, it then being unnecessary to take the plate 12 and the required flange that it requires, into consideration in making the die body.

I claim:—

1. A die comprising a core, a plurality of blades carried by the core in the direction of the axis and extending therefrom in curvilinear directions, said blades being level with the core at one end and being relatively thick and being relatively thin at the opposite ends and sloping to a point centrally of the core, and a plate applied to the die across the level portions of the blades and core, said plate being separable for the purpose of cleaning the die.

2. An imprinting machine having a follower head and a tray with a dough pocket; in combination, a die comprising a core having a plurality of blades extending from the core in the direction of the axis thereof, a plate interposed between the follower head and die, being larger in diameter than the pocket to prevent dough from squeezing out when the follower head is imposed upon the tray, and means passing through the follower head, plate and into the die to secure the die and plate in position.

MEYER COLLIS.